P. HARNIST.
Harvester Rake.

No. 16,582.    Patented Feb. 10, 1857.

UNITED STATES PATENT OFFICE.

PETER HARNIST, OF MARINETOWN, ILLINOIS.

IMPROVED RAKING ATTACHMENT FOR REAPERS.

Specification forming part of Letters Patent No. 16,582, dated February 10, 1857.

*To all whom it may concern:*

Be it known that I, PETER HARNIST, of Marinetown, in the county of Madison and State of Illinois, have invented a new and Improved Raking Attachment to be Applied to Reapers; and I do hereby declare that the following is a full, clear, and exact description of the same, reference being had to the annexed drawings, making a part of this specification, in which—

Figure 1:
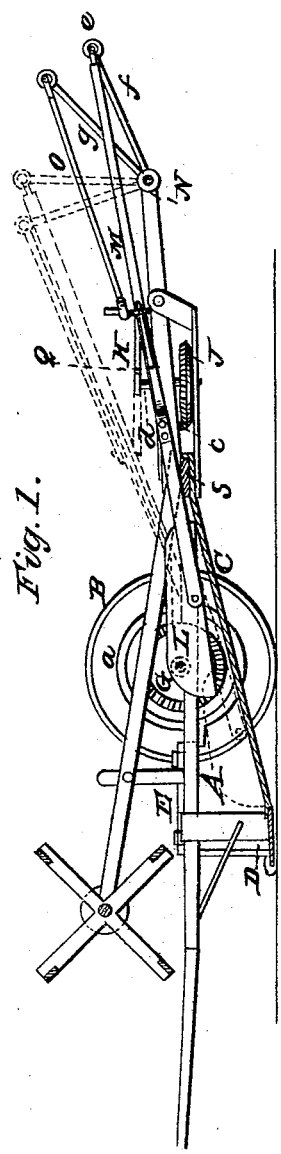
Figure 2:
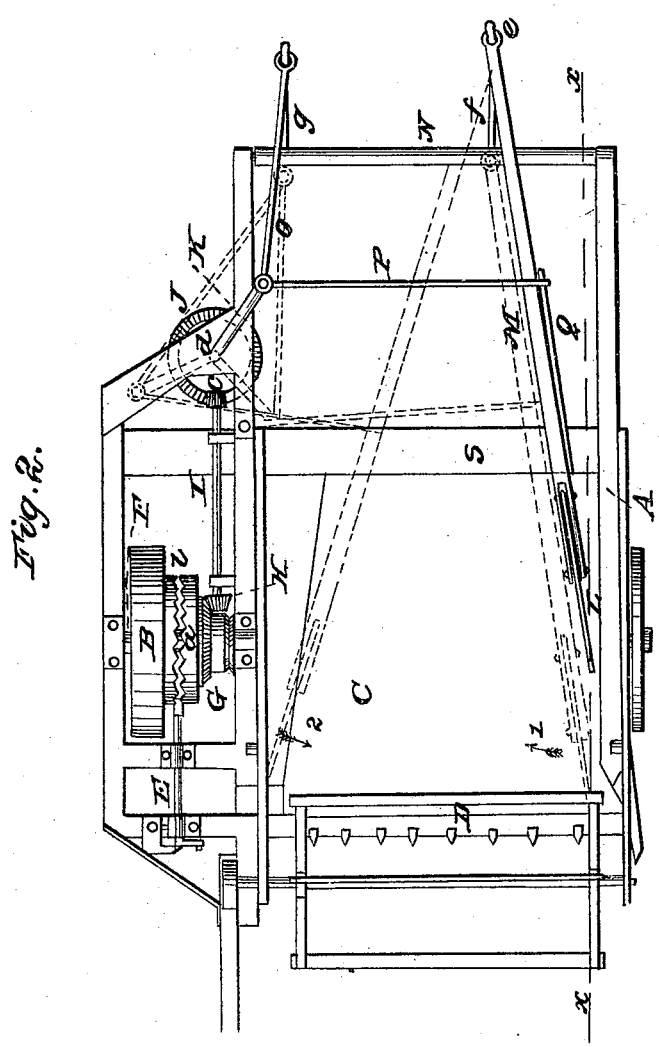

Figure 1 is a longitudinal vertical section of a reaper with my improvement applied to it, *x x*, Fig. 2, showing the plane of section. Fig. 2 is a plan or top view of the same.

Similar letters of reference indicate corresponding parts in the two figures.

My invention relates to a peculiar manner of operating a reciprocating rake.

To enable those skilled in the art to fully understand and construct my invention, I will proceed to describe it.

A represents the main frame of a reaper.

B is the driving-wheel; and C is the platform, secured to the frame A in any proper manner. The driving-wheel B has a rim, *a*, attached to its inner side, said rim having a zigzag slot, *b*, made through it, said slot driving the sickle D by means of a crank-rod, E, one end of which fits in the slot *b*.

On the inner end of the axle F of the driving-wheel B a toothed wheel, G, is placed, and this wheel gears into a pinion, H, placed on the end of a shaft, I, fitted longitudinally on the frame A. The opposite end of the shaft I has a pinion, *c*, placed on it, and this pinion gears into a wheel, J, placed on the frame A, the upper end of the axis *d* of the wheel J having a crank, K, upon it.

L represents a rake-head, which is pivoted in the end of a rod, M, the pivot passing through the center of the rake-head, or at a point near the center. The outer end of the rod M is connected by a joint, *e*, to an arm, *f*, attached to a rock-shaft, N, at the back end of the frame A. An arm, *g*, is also attached to the rock-shaft N, the arm *g* being out of parallel, or placed obliquely with the arm *f*. The upper end of the arm *g* is connected with the crank K by a rod, O.

P is a rod, one end of which is attached to the crank K and the opposite end to a spring, Q, secured to the rod M.

From the above description of parts it will be seen that as the machine is drawn along the crank K will be rotated and a lateral reciprocating motion will be given the rake-head L, and also an up-and-down and backward-and-forward motion. The lateral reciprocating motion is produced by the connecting-rod P, and the forward-and-backward motion is produced by the rock-shaft N. The up-and-down motion is produced by the forward-and-backward motion, as the outer end of the rod M is depressed as it is drawn back and the rake-head at the opposite end consequently elevated, the rake-head being lowered or depressed as the rod M is moved forward, so that the rake-head will bear upon the surface of the platform. The rake-head is moved forward just previous to its movement indicated by the arrow 1, and the grain is swept or raked off from the platform by this movement, the rake-head being elevated above and free from the platform during the reverse movement of the rake, as indicated by arrow 2, so that the rake will offer no obstruction to the cut grain as it falls upon the platform. The rod M, when the rake-head is elevated, rests and traverses over a bar, S, at the back end of the platform. In consequence of the rake-head being pivoted to the rod M, it is allowed to adjust itself so that it will bear properly upon the platform while raking off the cut grain.

The above improvement is extremely simple and effective. There are no parts liable to get out of repair. The spring Q allows the rake-head to be pressed snugly against the outer side of the platform without causing an undue strain upon any of the working parts.

Having thus described my invention, what I claim as new, and desire to secure by Letters Patent, is—

Operating the rod M, to which the rake-head L is pivoted, by means of rock-shaft N, arms *g f*, and connecting-rods P O, in combination with spring Q, crank K, and bar S, when the same are constructed and arranged for joint operation substantially in the manner and for the purpose set forth.

PETER HARNIST.

Witnesses:
BERNARD SUPPIGER,
JOSEPH SUPPIGER.